(12) United States Patent
Rao et al.

(10) Patent No.: US 12,438,617 B2
(45) Date of Patent: *Oct. 7, 2025

(54) OPTICAL TRANSCEIVER MISCONNECTION DISCOVERY

(71) Applicant: Cisco Technology, Inc., San Jose, CA (US)

(72) Inventors: Gudipaty Vasanta Rao, Sunnyvale, CA (US); Anjali Mysore Vijayakumar, San Jose, CA (US); Ratna Reddy Chada, Hudson, MA (US); Joanne Tse, San Ramon, CA (US); Darja Padilla, San Jose, CA (US); Mark Charles Nowell, Kanata (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 18/447,692

(22) Filed: Aug. 10, 2023

(65) Prior Publication Data

US 2023/0388020 A1 Nov. 30, 2023

Related U.S. Application Data

(63) Continuation of application No. 17/585,827, filed on Jan. 27, 2022, now Pat. No. 11,777,609.

(51) Int. Cl.
*H04B 10/40* (2013.01)
(52) U.S. Cl.
CPC .................................. *H04B 10/40* (2013.01)
(58) Field of Classification Search
CPC .................................................... H04B 10/40

USPC ......................................................... 398/135
See application file for complete search history.

(56) References Cited

U.S. PATENT DOCUMENTS

| | | | |
|---|---|---|---|
| 5,469,288 | A | 11/1995 | Onaka et al. |
| 6,473,224 | B2 | 10/2002 | Dugan et al. |
| 8,538,260 | B2 | 9/2013 | Niven-Jenkins et al. |
| 8,774,632 | B2 | 7/2014 | Archambault |

(Continued)

FOREIGN PATENT DOCUMENTS

| | | |
|---|---|---|
| JP | 2012023586 A | 2/2012 |
| KR | 100918390 B1 | 9/2009 |
| WO | 2021043424 A1 | 3/2021 |

OTHER PUBLICATIONS

International Search Report and Written Opinion for International Application No. PCT/US2023/011208, mailed May 11, 2023, 13 Pages.

*Primary Examiner* — Dalzid E Singh
(74) *Attorney, Agent, or Firm* — Edell, Shapiro & Finnan, LLC

(57) ABSTRACT

A method for optical transceiver misconnection identification that allows a simple low-level process to monitor and communicate optical transceiver characteristics information between two optical transceiver modules regardless of their transceiver type to determine if they are correctly connected or mismatched. If a mismatch is determined, the knowledge gained about the transceiver type of a far end module may be obtained (and presented to an installer) and used by an installer to select and install a module that is operationally compatible with the far end optical module.

20 Claims, 8 Drawing Sheets

(56) References Cited

U.S. PATENT DOCUMENTS

| | | |
|---|---|---|
| 9,136,968 B2 | 9/2015 | Lee et al. |
| 9,780,908 B2 | 10/2017 | Vetter et al. |
| 10,397,091 B1 | 8/2019 | Gumier et al. |
| 10,439,726 B1 | 10/2019 | Mazzini et al. |
| 11,146,335 B1 | 10/2021 | Zhong et al. |
| 2003/0058496 A1 | 3/2003 | Obeda et al. |
| 2004/0197101 A1* | 10/2004 | Sasser ................ H04B 10/6911 398/117 |
| 2007/0177879 A1* | 8/2007 | Hsieh .................... H04B 10/40 398/151 |
| 2008/0166131 A1 | 7/2008 | Hudgins et al. |
| 2010/0054733 A1* | 3/2010 | Hosking ................ H04B 10/40 398/25 |
| 2011/0020007 A1* | 1/2011 | Ekkizogloy ............ H04B 10/40 398/139 |
| 2011/0191632 A1* | 8/2011 | Miller .................... G06F 11/28 714/E11.178 |
| 2013/0136445 A1 | 5/2013 | El-Ahmadi et al. |
| 2018/0302155 A1 | 10/2018 | Kim et al. |
| 2019/0081699 A1 | 3/2019 | Tang et al. |
| 2019/0238250 A1 | 8/2019 | Tajima et al. |
| 2020/0244365 A1* | 7/2020 | Son .......................... G02B 6/43 |

\* cited by examiner

FIG. 2

OPTICAL TRANSCEIVER MISCONNECTION DISCOVERY

CROSS REFERENCE TO RELATED APPLICATION

This application claims priority to U.S. application Ser. No. 17/585,827, filed Jan. 27, 2022, now U.S. Pat. No. 11,777,609, issued Oct. 3, 2023, the entirety of which is incorporated herein by reference.

TECHNICAL FIELD

The present disclosure relates to optical communication devices, such as optical networking equipment.

BACKGROUND

When a network system operator installs pluggable optical transceiver modules (often called "pluggable modules" or "optical modules") into networking equipment, the availability of various types of pluggable optical transceiver modules has led to instances where technicians can mistakenly install and connect pluggable optical transceiver modules of different types at either end of a link, resulting in link down failure because the near end optical transceiver module is not operationally compatible with the far end optical transceiver module. This issue may be compounded by a number of factors. First, it can be difficult for the technician to distinguish between different pluggable optical transceiver module types, as the physical appearance of the optical modules are quite similar despite the distinct color of their pull tabs. Second, both ends of the link might not be local to each other, to easily enable one person to validate the modules and the connection. The technician may "own" a networking rack and perhaps the rack next to it, but the other side of the link is usually handled by another technician that could be hundreds of yards away or a few racks away. The technician rarely walks to the other side of the link to see what type of device is on the other side of the link. Sometimes the technician will just keep swapping the optical modules to see if they hit a match or compatibility with the optical module on the other side of the link.

When an optical module misconnection occurs, it can be beyond the installer's ability to realize it. Only when the link is brought up at the network/data communication protocol level does an issue get identified, often without a root cause determination and perhaps at a time when the installer is no longer physically near the equipment. These scenarios sometimes result in the optical modules being removed and shipped back to the supplier for root cause analysis, when the only real issue is that the two optical modules (which are likely in operating normally) are just operationally incompatible with each other. In some instances, the installer has minimal equipment, perhaps just an infrared (IR) detection card, not even an optical power meter, to confirm that some light is being transmitted out of a module.

BRIEF DESCRIPTION OF THE DRAWINGS

FIG. 2 is a diagram illustrating the ability of various types of optical transceivers to be able to detect an optical transmission from each other.

DESCRIPTION OF EXAMPLE EMBODIMENTS

Overview

Briefly, techniques are provided for optical transceiver misconnection identification that communicate optical transceiver characteristics information between two optical transceiver modules regardless of their transceiver type to determine if the two optical transceiver modules are correctly connected or are mismatched. If a mismatch is determined, the knowledge gained about the transceiver type of a far end module may be obtained (and presented to an installer) and used by an installer to select and install a module that is operationally compatible with the far end optical module.

In one form, a method is provided comprising: receiving at a first optical transceiver module, via an optical fiber, from a second optical transceiver module, an optical transmission modulated with data that indicates a transceiver type of the second optical transceiver module; and determining at the first optical transceiver module, based on the transceiver type of the second optical transceiver module, whether the first optical transceiver module is operationally compatible with the second optical transceiver module.

In another form, a method is provided comprising: receiving at a first optical transceiver module, via an optical fiber, from a second optical transceiver module, an optical transmission modulated with data that indicates a transceiver type of the second optical transceiver module; and presenting on a host device connected to the first optical transceiver module or on the first optical transceiver module, an indication of the transceiver type of the second optical transceiver module.

Example Embodiments

Presented herein are techniques to quickly detect optical module misconnection after installation and provide immediate feedback to the installer before the network layer bring-up is attempted. In addition, the results of the misconnection discovery process are provided in a host-readable information form to help resolution at the network level, if necessary. This method of transceiver misconnection identification may be useful to help datacenter operators detect and resolve link down failure scenarios due to optical module type mismatch, reducing installation time and mitigating debug costs/resources. The transceiver misconnection identification/discovery techniques disclosed herein are useful to detect and report/notify when optical modules of the same type are connected or if there is a poor connection due to fiber installation.

Figure 1:
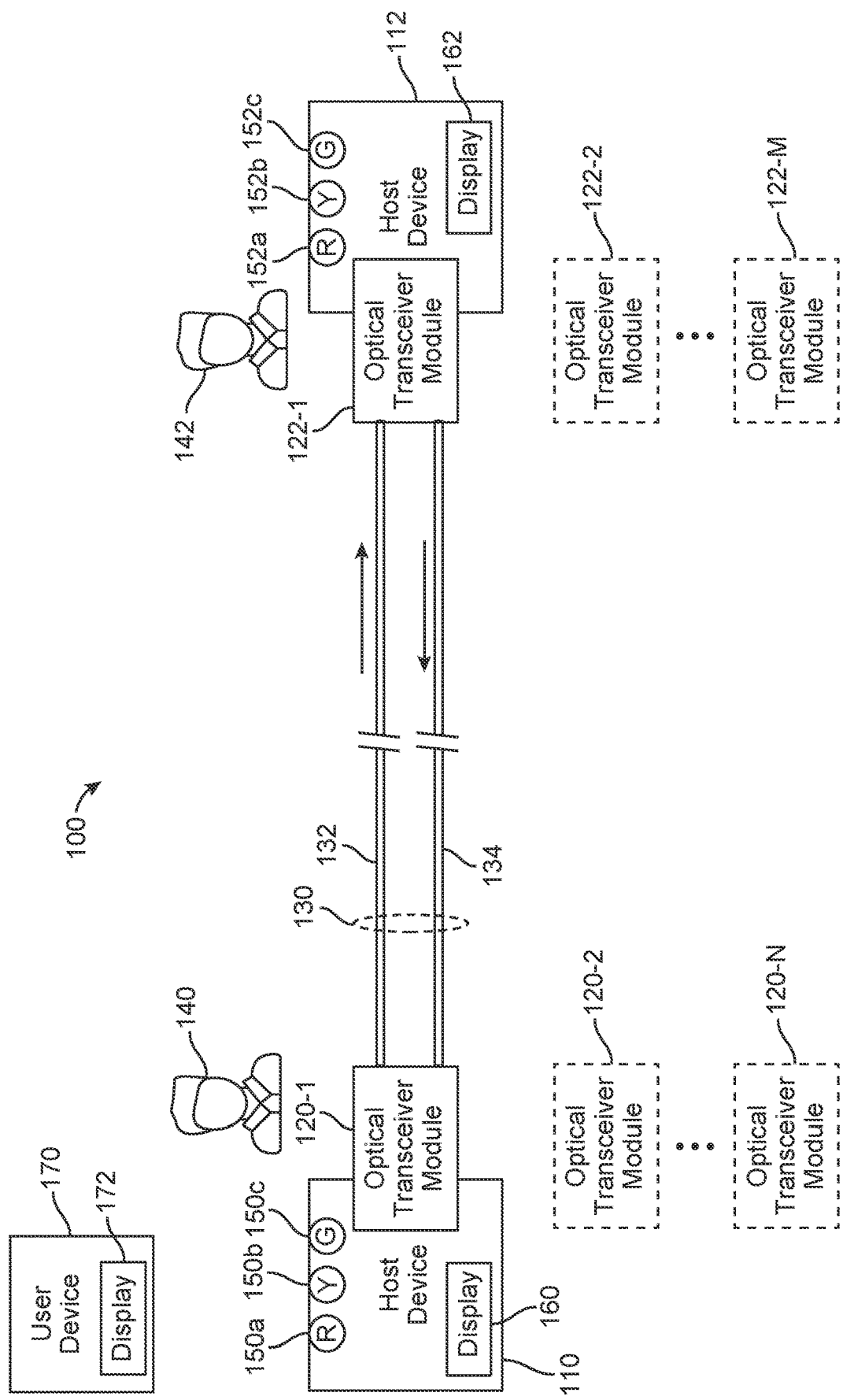
FIG. 1 is a diagram of a networking environment in which two host devices communicate with each other via an associated optical transceiver module, and in which the optical transceiver modules of the respective host devices are configured to perform a discovery process to determine operational compatibility with each other, according to an example embodiment.

Reference is now made to FIG. 1, which shows a networking environment 100 in which the transceiver misconnection discovery techniques may be employed. The networking environment 100 includes a first host device 110 and a second host device 112. The host devices 110 and 112 are each configured to connect with any one of a variety of types of pluggable optical transceiver modules. The host devices 110 and 112 may be switches, routers, gateways, etc., and may reside in the same datacenter or network or possibly in different datacenters or networks. The host devices 110 and 112 may be in different racks that are physically separated by several yards or hundreds or yards, or may be much more remote from each other, such as in different buildings, or even in different geographical locations entirely (many kilometers from each other).

In the example shown in FIG. 1, at the location of the host device 110, there are available to an installer/technician, pluggable optical transceiver modules 120-1, 120-2, . . . , 120-N, and at the location of the host device 112 there are available to an installer/technician, pluggable optical transceiver modules 122-1, 122-2, . . . , 122-M. Moreover, in the example shown in FIG. 1, a technician has selected and installed pluggable optical transceiver module 120-1 to host device 110 at one end of a link 130, and a technician (sometimes a different technician) has selected and installed optical transceiver module 122-1 into host device 112 at the other end of the link 130. The link 130 is an optical communication link that may include one or more optical fibers. In the example shown in FIG. 1, the link 130 includes a first optical fiber 132 that carries traffic in a first direction, such as from the host device 110 to the host device 112, and a second optical fiber 134 that carries traffic in a second direction, such as from the host device 112 to the host device 110. It is also possible, however, that the link 130 is a single optical fiber that carries communications in both directions, simultaneously, (in different wavelength ranges). The techniques presented herein are applicable to cases where the link 130 includes one or several optical fibers between the optical transceiver modules.

The installer/technician who installed optical transceiver module 120-1 into host device 110 may have no knowledge about the particular type of optical transceiver module 122-1 installed into host device 112, and vice versa. Consequently, there is a possibility that optical transceiver module 120-1 and optical transceiver module 122-1 are of transceiver types that are operationally incompatible with each other, and this will result in a misconnection. If optical transceiver module 120-1 and optical transceiver module 122-1 are operational incompatible with each other, it will not be possible to set up network layer communications from host device 110 to host device 112 over the link 130. Optical transceiver module 120-1 and optical transceiver module 122-1 need not be of the exact same type to be operationally compatible with each other, as there are cases where optical transceiver modules of different types are nevertheless operationally compatible with each other, and could support network layer communications. A misconnection, as described herein, refers to the situation in which optical transceiver modules on opposite ends of an optical link are operationally incompatible with each other (such that they cannot support network layer communications). For example, a 100GBASE-LR4 optical module (where "LR4" denotes Long Range/Reach and 4 lanes (each of 25 Gb/s) and a 100G-CWDM4 optical module (where CWDM stands for Coarse Wavelength Division Multiplexing and "4" denotes 4 lanes (each of 25 Giabitb (G)/s)) are not operationally compatible with each other due to each having different specified wavelength grids for their 4 wavelengths.

To discover the possibility of a misconnection of an optical module on a link, the method presented herein may use low-level/low speed optical communication (e.g., a simple modulation scheme at a relatively low speed/rate) to advertise a transceiver type of a near end optical module to a remote end optical module. That is, optical transceiver module 120-1 is configured to send to optical transceiver module 122-1 over link 130 (e.g., over optical fiber 132) a low speed optical transmission (called a "discovery transmission") that is modulated with data that includes or indicates a transceiver type of the optical transceiver module 120-1. The discovery transmission is an optical transmission modulated with data that indicates the transceiver type of optical transceiver module 120-1. In one form, the discovery transmission is sent prior to higher-level/network-level protocol communication has been established between the near end far end. As a result, the discovery transmission is an optical transmission that does not carry network data traffic; it may be a low speed optical transmission, where the "low speed" is relative to the much higher speed at which network data is typically modulated on an optical signal for optical transmission.

Optical transceiver module 122-1 is configured to receive the discovery transmission from optical transceiver module 122-1, recover/extract the data carried by the discovery transmission, and determine whether it is operationally compatible with optical transceiver module 120-1. Similarly, optical transceiver module 122-1 is configured to send to optical transceiver module 120-1 over link 130 (e.g., over optical fiber 134) a discovery transmission that is modulated with data that includes or indicates a transceiver type of the optical transceiver module 122-1. Optical transceiver module 120-1 is configured to receive the discovery transmission from optical transceiver module 122-1, recover/extract the data carried by the low speed optical transmission, and determine whether it is operationally compatible with optical transceiver module 122-1. This can, but need not, happen simultaneously.

This description focuses on single mode fiber (SMF) transceivers. However, the misconnection discovery method is applicable to other types of transceivers as well, such as multi-mode fiber (MMF) transceivers.

The misconnection discovery process may be initiated after the optical module has been inserted into a host device and initialized, but before any higher-level network link initialization occurs. The goal is to enable the installer to receive feedback on whether the modules on both ends of the optical link are operationally compatible before the network operations team tries to initialize the network link. During installation, the installer may be doing work across many racks of equipment before the network layer is initialized. Timely identification of a misconnection can save considerable time in this bring-up process.

As shown in FIG. 1, each host device 110 and 112 may include one or more light emitting diodes (LEDs) that can be activated to indicate to the associated installer/technician 140 and 142, respectively, whether the optical module on the far end is compatible with the near end optical module. That is, the host device 110 may include an array of LEDs 150a, 150b and 150c that are configured to illuminate Red (R), Yellow (Y) or Green (G), respectively, to indicate to installer/technician 140 operational compatibility of the optical transceiver module 122-1 with optical transceiver module 120-1, where, as an example, a specific flashing Red sequence denotes operational incompatibility, a specific flashing sequence Yellow denotes discovery not possible (such as due to a dirty optical connector or bad connection) resulting from corrupted discovery transmission, and a specific flashing Green sequence denotes operational compatibility. Similarly, host device 112 may include an array of LEDs 152a, 152b and 152c that are configured to illuminate Red (R), Yellow (Y) or Green (G), respectively, to indicate to installer/technician 142 operational compatibility of the optical transceiver module 120-1 with optical transceiver module 122-1. A single multi-color LED may be used instead of an array of LEDs of different colors. The host device 110 may further include a display panel 160 (flat screen display of any suitable technology) that can display information derived from the discovery process presented herein, such as the transceiver type of a far end optical transceiver module learned from the discovery process. Similarly, the host device 112 may also include a display 162. Thus, this discovery process may inform the installer as to the transceiver type on the far end and with that information, the installer will know types of optical transceiver modules can be installed at the near end to be operationally compatible with the far end.

An installer may also carry a user device that can communicate, e.g., wirelessly or by a wired connection, with a host device, to determine status of the host device and status of the link 130. The user device may be laptop computer, tablet computer, Smartphone, or a dedicated/specially configured portable device. For example, the installer 140 may have or carry user device 170 that includes a display 172. The host device 110 may provide status information to the user device for presentation on the display 172 to the installer 140. In this way, the installer 140 may also learn about the status of link 130 and also be presented with notifications about the compatibility and the transceiver type of the optical transceiver module 122-1 that the optical transceiver module 120-1 provides to the host device 110. Installer 142 may also interact with host device 112 in a similar manner, but a separate user device for installer 142 is not shown in FIG. 1, for simplicity. Thus, once an optical transceiver module recognizes a misconnection using the techniques presented herein, the optical transceiver module is able to have the information read from it through the host management interface which could also inform a person of the misconnection. This person could be the installer who might be connected to some system/network management port or alternatively someone in an operational center. This may be an alarm that would quickly root cause an issue before trying to turn on the network layer.

Further aspects of the notifications that may be presented to an installer are described below. It is also possible/envisioned that the LED(s) and a display may be resident on an optical transceiver module instead of, or in addition to those on a host device, and there may be LED(s) associated with each port of a host device. In other words, a host device may have multiple pluggable modules installed therein to support communications over multiple ports.

The optical modules may have different wavelength grids, different reaches and/or different speeds/modulation schemes. Some optical modules may not normally (as originally designed) communicate with each other. The misconnection discovery method provides a way to enable a basic level of communication between optical modules that could otherwise be of different types and not at all intended to communication with each other.

The challenge of communicating between potentially disparate types of optical transceiver modules is that the transmitter wavelength(s) of one optical module may not align with the receiver wavelength(s) of the other optical module. However, with some knowledge of the transceiver type of an optical module that is inserted into a host, it is possible to select a wavelength or channel that has the highest probability of being received by the optical module at the other end. As described below, it is highly likely that at least one end of the link will be able to declare a misconnection, if it has occurred, and likely both ends will be able to do so. Also, as described further below, the installer can be alerted of a misconnection through the port LEDs as well as the information being reported through the management interface of an optical module.

The misconnection discovery techniques presented herein account for several aspects, including: (1) at a physical layer, the possibility of two optical transceiver modules of different types receiving optical signals from each other; (2) the ability to use a common lower speed optical transmission with some type of signal coding/modulation to carry transceiver type information, that can be detected on the other end; (3) logic running on the optical transceiver module to control generating of the discovery transmission (with transceiver type information) and determining whether there is a connection or misconnection with the far end optical module based on the transceiver type information obtained from a received discovery transmission from the far end optical module; and (g) providing an alarm or notification when operational incompatibility (misconnection) is determined, as well as information about the transceiver type on the far end (regardless of whether of operational compatibility).

Transmit Wavelength Selection for Discovery Transmission

Figure 2:
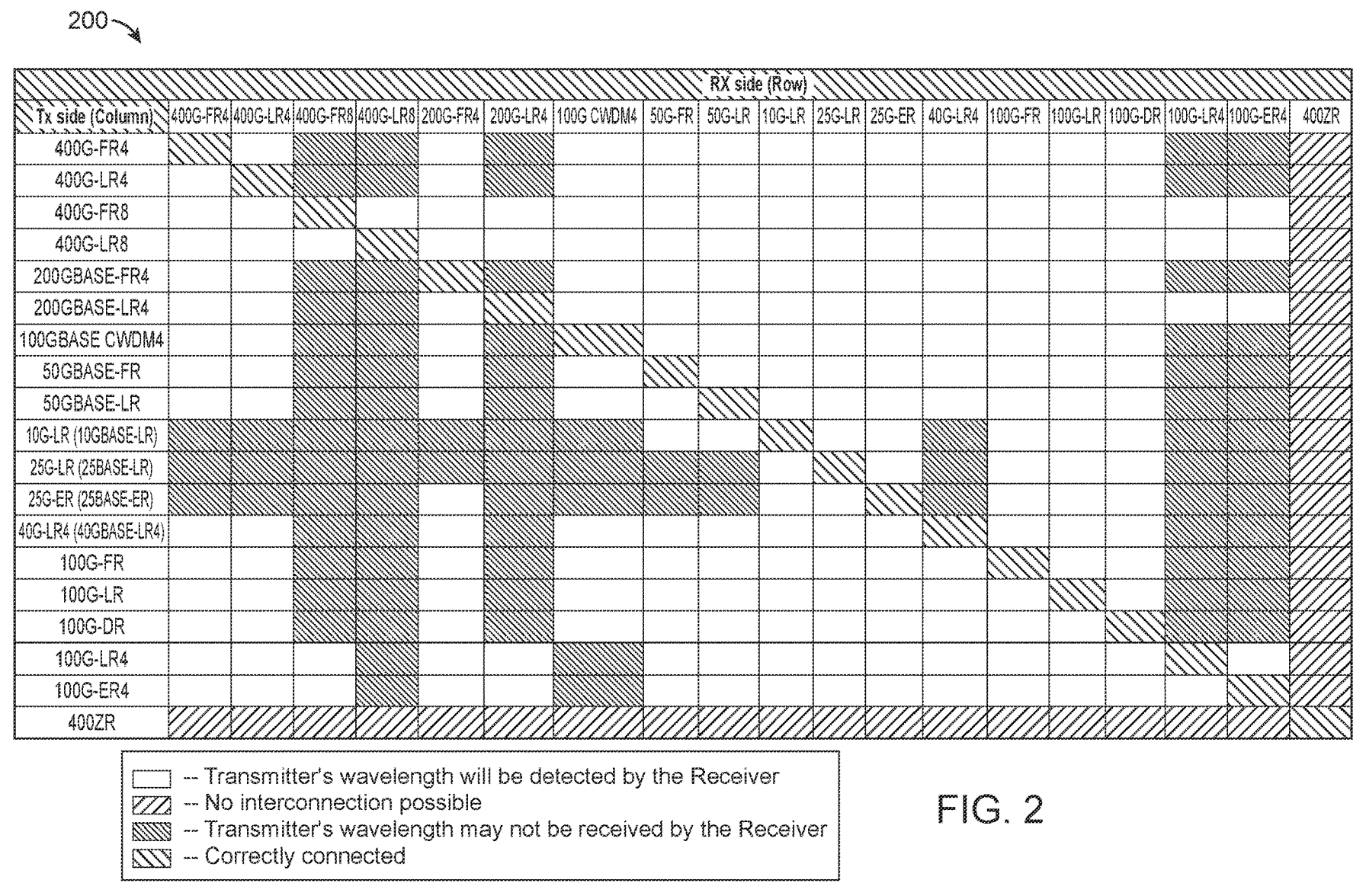

FIG. 2 illustrates a matrix 200 depicting the ability for a variety of transceiver types to detect an optical transmission across transceiver type. This is not meant to be an exhaustive list, and again, includes SMF transceiver, as a non-limiting example. The transceiver types in FIG. 2 are (using the standard and well-known industry nomenclature): 400G-FR4, 400G-LR4, 400G-FR8, 400G-LR8, 200GBASE-FR4, 200GBASE-LR4, 100GBASE CWDM4, 50GBASE-FR, 10G-LR (10GBASE-LR), 25G-LR (25GBASE-LR), 25-ER (25GBASE-ER), (40GBASE-LR4), 100G-FR, 100G-LR, 100G-DR, 100G-LR4, 100G-ER4, and 400ZR.

As shown by the matrix of FIG. 2, in the majority of mismatch scenarios, an optical signal could be detected in at least one direction. Depending on the standard and how narrow the wavelength grid is being utilized, the end of the link that can always detect the signal is generally the one that has the wider wavelength range (less restrictive filtering) as the receiver. The modules based on Local Area Network—Wavelength Division Multiplexing (LAN-WDM) have the most challenging characteristics for being able to receive a broad range of inputs, but it is noted that the LAN-WDM based devices are less common in network deployments currently.

In the scenario where only one end can detect a incoming optical signal, there are two possibilities:

1. There is a high probability that the other end of the link will correctly identify a misconnection so the installer and network operator will still be aided in diagnosing a misconnection from the end that definitively declares a misconnection. Thus, even if only one end can guarantee a misconnection, that resolves the operational issue. One end is sufficient.
2. If this misconnection discovery technique is deployed broadly, future optical modules could be designed with a power monitor tap (before demultiplexing) to allow misconnection detection in both directions. This aspect is described further below.

Based on the various optical communication standards, it was determined that for each type of optical module, it is possible to predetermine a transmit channel (wavelength) to send the discovery transmission towards the other end with the highest likelihood of success. This is depicted by the wavelength matrix 300 shown in FIG. 3.

Based on the information presented in FIG. 3, a TX channel to be used may be as follows.

| Optical Transceiver Module Type | Wavelength to use for Sending Discovery Transmission |
| --- | --- |
| 10G-LR, 25-LR, 25G-ER 400G-FR4, 400G-LR4, 50G-FR, 50G-LR, 200G-FR4, 200G-LR4, 100G-CWDM4, 40G-LR4, 100G-FR, 100G-LR, 100G-DR | Use their single wavelength 1304.5-1317.5 nm |
| 400G-LR8, 400G-FR8 | 1309.14-1310.19 nm |
| 100G-LR4, 100G-ER4 | 1308.09-1310.19 nm |
| 400ZR | Ignore because the wavelength range is different from other standards since it uses DWDM |

Figure 3:
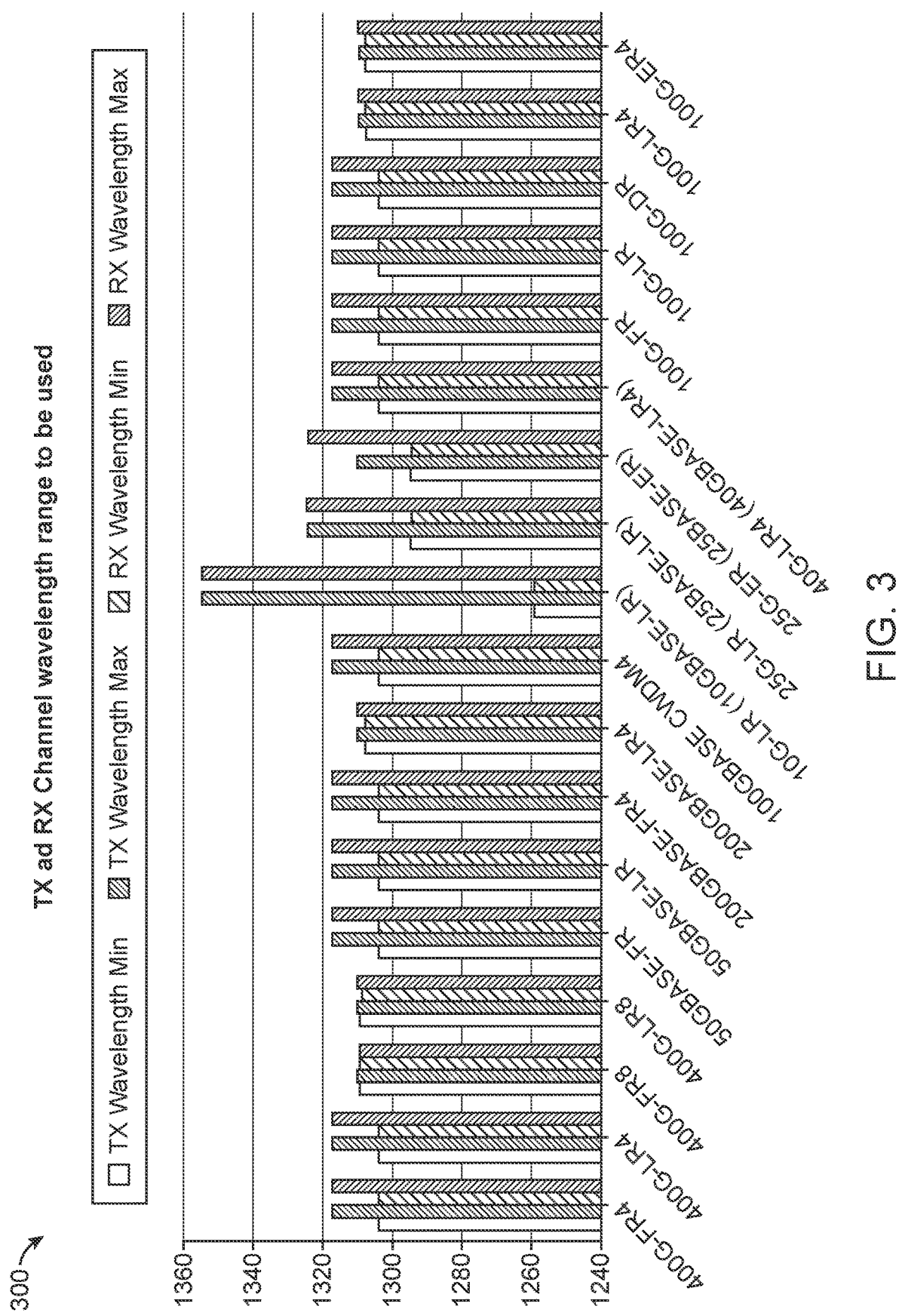
FIG. 3 is a diagram depicting wavelengths that may be used for communication between various types of optical transceivers.

FIG. 3 shows that a receiver of a module with a wider wavelength range will receive a discovery transmission from a transmitter of a module with a narrower wavelength range. A given optical module can select a specific wavelength, and the optical module on the other end should be able to receive it. Thus, in at least in one direction (on one side) one could determine there is a mismatch. That is, even if only one end is going to detect a discovery transmission from the other end, it will be possible to determine there is a misconnection. This involves only a minor firmware update on optical transceiver modules to achieve and can therefore handle legacy equipment.

The transmit (TX) wavelength to be used is known based on the module type (from FIG. 2). The module type is saved in a data storage of the module (e.g., register, EEPROM, etc.). The channel number that could be used in this discovery transmission can be predetermined and read by module firmware. Since a device on one end knows what type it is, it can select the wavelength to use to give it the highest probability of getting light through to the other end. This process can be extended to iterate through other transmit wavelengths if the process fails to produce a result using the initial wavelength choice.

Modules have different reaches (short, long, extended, etc.) The discovery transmission is a low speed optical signal transmission (laser light pulsed on/off) and the receiver should be able to discriminate between absence and presence of light. Based on the likely module types, fiber lengths and matrix of misconnections possible, it is highly probable that the receiver will be able to detect the discovery transmission. However, in a high percentage of cases, there is a physical layer link that can be established in at least one direction and that power can be detected through power monitoring. In the worst case, there is a possibility that the receiver is not able to detect the discovery transmission. In this rare case when power is not detected, the installer can immediately understand that there is a module mismatch or a fiber issue.

Figure 4:
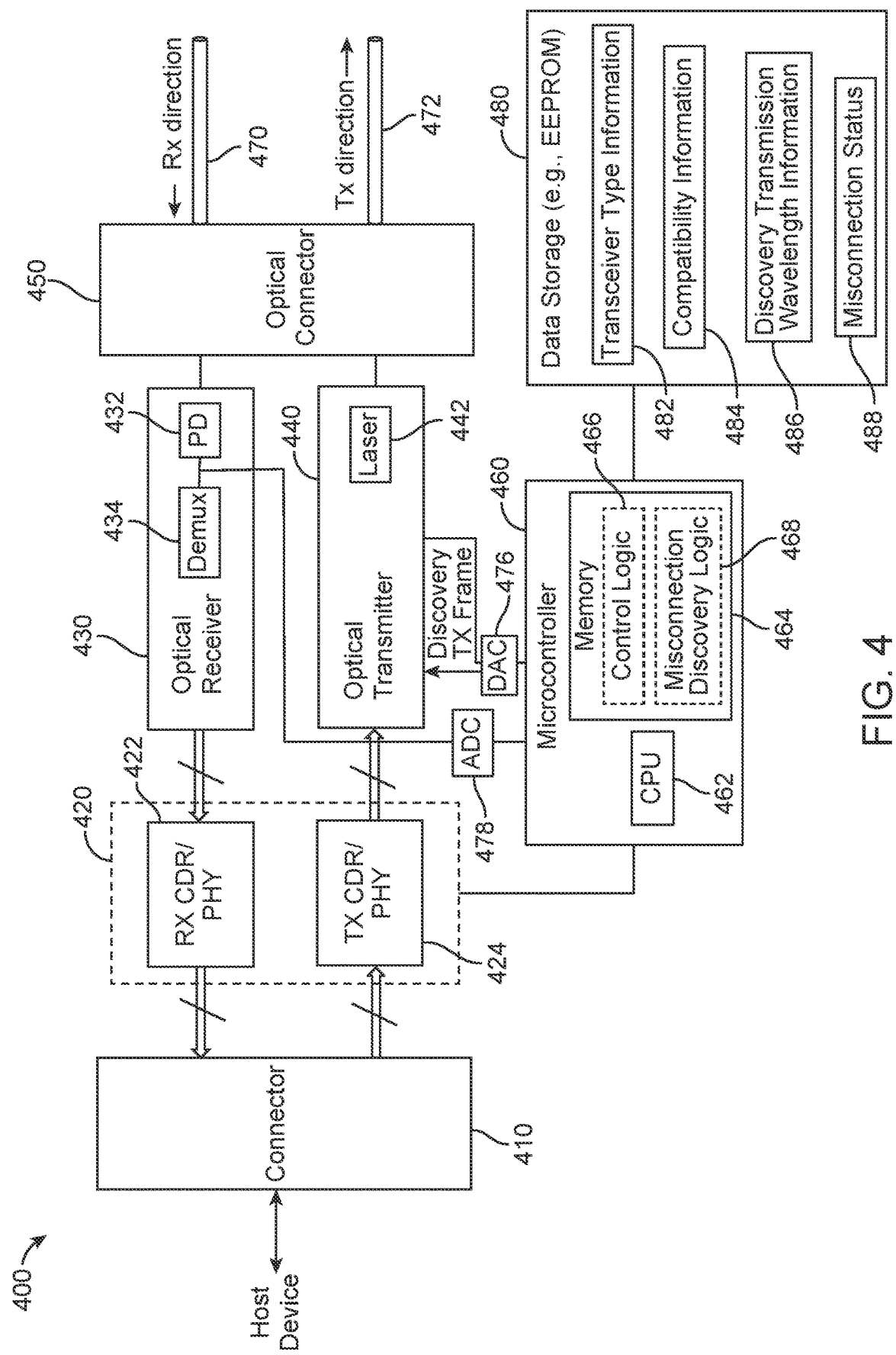
FIG. 4 is a block diagram of an optical transceiver module configured to perform a misconnection discovery process, according to an example embodiment.

Reference is now made to FIG. 4, which shows a simplified block diagram of an optical transceiver module 400 configured to perform the discovery operations described herein. The optical transceiver module 400 includes a connector 410 that connects to a host device, an electrical domain modem/processor 420 that includes a receive clock data recovery (CDR)/PHY section 422 for receive signal processing and a transmit CDR/PHY section 424 for transmit signal processing, an optical receiver 430, an optical transmitter 440, an optical connector 450, and a microcontroller 460. The optical receiver 430 includes a photodetector (PD) 432 (and in some cases, a bank of multiple PDs) and a demultiplexer (demux) 434. In addition, the optical transmitter 440 includes at least one laser 442 (and in some cases, a bank of multiple lasers). The microcontroller 460 may receive as input a tap of the power at the output of the PD 432, but before the demux 434, for purposes described herein.

The microcontroller 460 may be a software-programmable processor (microprocessor, digital signal processor, etc.) that includes a central processing unit (CPU) 462 and a memory 464. The microcontroller 460 performs various control operations based on software instructions for control logic 466 stored in memory 464 and also performs misconnection discovery operations based on software instructions for misconnection discovery logic 468 stored in memory 464.

The optical connector 450 connects to one or more optical fibers. In one example, the optical connector 450 connects to a receive/inbound optical fiber 470 and to a transmit/outbound optical fiber 472.

The optical transceiver module 400 further includes a data storage 480 that is used to store various information used by the optical transceiver module 400. In one embodiment, the data storage stores transceiver type information 482 that indicates the transceiver type of the optical transceiver module 400, compatibility information 484 and discovery transmission wavelength information 486. The compatibility information 484 is information indicating which different transceiver types are operationally compatible with each other. The microcontroller 460 uses the transceiver type information 482 and performs a look up in the compatibility information 484 to determine whether the transceiver type of the optical transceiver module 400 is operationally compatible with the transceiver type (derived from a received discovery transmission) of a far end optical transceiver module. The discovery transmission wavelength information 486 indicates which one or more wavelength (channels) the optical transceiver module 400 should use, based on its transceiver type, when sending a discovery transmission to a far end optical transceiver module. In one non-limiting example, the data storage 480 may be an Electrically Erasable Programmable Read Only Memory (EEPROM). The transceiver type information 482, compatibility information 484 and discovery transmission wavelength information 486 may be stored in one or more dedicated registers of the data storage 480. The transceiver type information 482 may include electrical interface capability information of the optical transceiver module (as specified in Small Form Factor (SFF) specification 8024, table 4-5) including bit rate, modulation type and lane count, SMF and MMF media interface capable (as specified in SFF 8024, table 4-6), and media interface capability specifying active/passive copper cable, loopback module or active optical cable. Further still, the data storage 480 may include misconnection status location (register) 488 to contain information pertaining to whether there is a misconnection (incompatibility) with a remote optical module. The microcontroller 460 retrieves from the data storage the various information described above, and uses that information for a variety of purposes, including to determine whether the far end optical transceiver is compatible with the near end optical transceiver module.

The microcontroller 460 is used to perform control functions for the optical transceiver module 400 when it is in normal operations. The microcontroller 460 is also used, according to the techniques presented herein, to enable the low speed optical communication in the transmit direction by turning the laser 442 on and off to modulate data on an optical signal, and thereby form a discovery transmission to be sent to the far end on optical fiber 472. Specifically, the microcontroller 460 may generate a discovery TX frame and provides it to the optical transmitter 440 via a digital-to-analog converter (DAC) 476. The discovery TX frame causes the optical transmitter 440 to turn the laser 442 on and off to generate the optical discovery transmission that is sent over the optical fiber 472 to a far end optical transceiver module. In the receive direction, the microcontroller 460 obtains a signal from an output of the PD 432 of the optical receiver 430, via an analog-to-digital converter (ADC) 478, and this received signal is representative of a received discovery transmission from a far end optical transceiver module. The RX CDR/PHY 422 and TX CDR/PHY 424 are not required for the misconnection discovery and can in fact be put into "bypass" mode or squelched while misconnection discovery is occurring.

The microcontroller 460 is able to perform several operations related to the misconnection discovery process presented herein. The microcontroller 460 can generate a discovery transmission signal by switching the laser on and off at relatively lower speeds/rates (i.e. 1 kHz-100 kHz) and thereby create a data sequence having encoded/modulated data representing transceiver type information for use at a far end optical transceiver module. The microcontroller can detect presence or absence of light (or loss of signal (LOS)) through power monitoring in order to obtain transceiver type information in a discovery transmission from a far end optical transceiver module. The microcontroller 460 can generate notification/alarm when an operational incompatibility is determined with respect to a far end optical module, and may communicate to a host device the results of the misconnection/identification discovery process.

The Low Speed Discovery Transmission/Sequence

Since the far end optical module will not have clock/data recovery synchronization to the near end optical module at the time the discovery process is executed, another technique is used to convey the transceiver type information between optical modules. The microcontroller 460 is configured to initiate a low speed optical transmission by implementing a simple modulation technique for switching the laser on and off in order to modulate the light produced by the laser according to the data to be transmitted. This simple modulation technique can be successfully demodulated/decoded at the far end optical module.

Figures 5A, 5B:
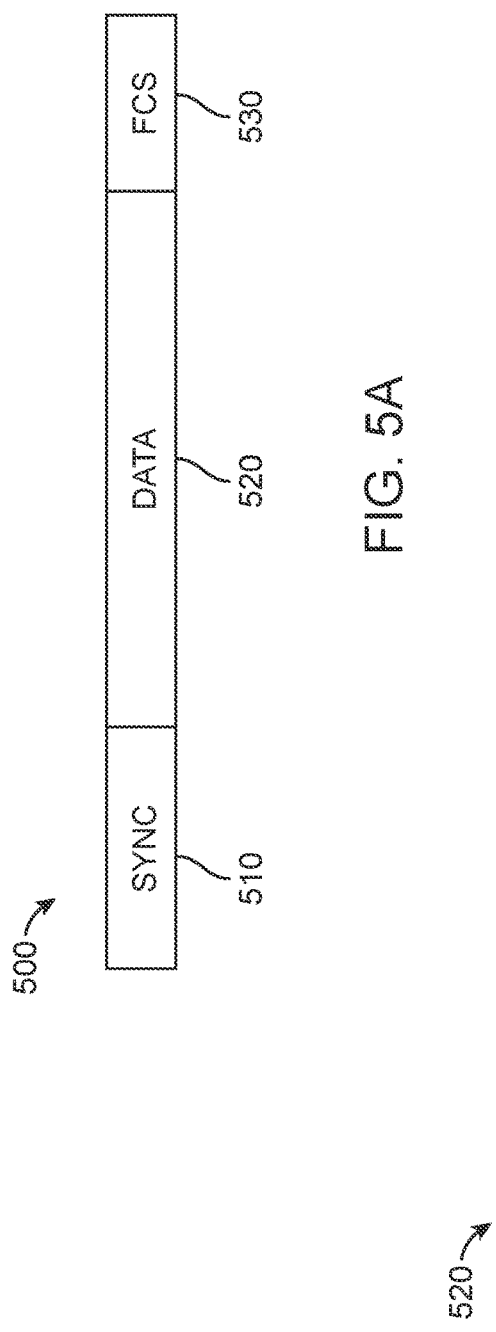
FIGS. 5A and 5B illustrate aspects of a discovery transmission that is generated and sent from a first optical transceiver module to a second optical transceiver module to enable the misconnection discovery process, according to an example embodiment.

Reference is now made to FIGS. 5A and 5B. FIG. 5A shows a packet structure for a discovery transmission 500. The discovery transmission 500 may include a synchronization frame 510, a data frame 520 and a frame check sequence (FCS) frame 530. The synchronization frame 510 provides information about the start of the discovery transmission 500. The data frame 520 contains data payload for the transceiver type information of the optical transceiver module that is sending the discovery transmission 500. The FCS frame 530 is used to validate/verify the error and integrity of the data frame 520.

The data frame 520 portion of the discovery transmission 500 is shown in FIG. 5B. The data frame 520 may include several pieces of information, including: transceiver type 540 read from the data storage 480, transmit wavelength channel 542 read from the data storage 480, electrical interface capability information 544, SMF and MMF media interface capability information 546, media interface capability information 548 specifying active/passive copper cable, loopback module, or active optical cable configuration, mismatch acknowledgement 550 indicating whether the local optical transceiver module has determined a mismatch (operational incompatibility), and a discovery complete acknowledgement 552 when the transceiver discovery is complete. The data frame 520 may include, at a minimum, the transceiver type 540. The other elements of the data frame 520 shown in FIG. 5B may be considered optional, but are useful if there is a failure/error.

The microcontroller 460 of the optical transceiver module sends the discovery transmission 500 containing the data frame 520 to the far end optical transceiver module to enable the far end optical transceiver module to determine whether it is operationally compatible with the near end optical transceiver module that sent the discovery transmission.

Discovery Operational Flow

The optical transceiver misconnection discovery process may be executed entirely within internal firmware of the optical transceiver module, and occurs at both ends of the link, near end optical transceiver module and remote/far end optical transceiver module.

Figure 6:
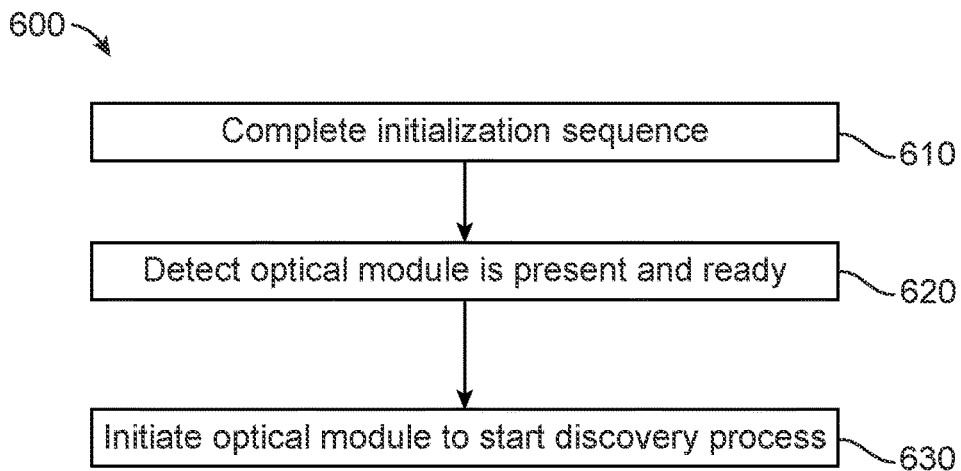
FIG. 6 is a high-level flow chart depicting operations of a host device connected to an optical transceiver module, according to an example embodiment.

Referring now to FIG. 6, a flow chart is shown depicting a process 600 performed by a host device. The optical transceiver misconnection discovery process occurs prior to the start of the host device asserting link up, but after the host has initialized the module and has the optical module in a ready state. At 610, the host device has provided nominal power to the module and has completed an initialization sequence. It is also assumed that the fiber cabling has been completed. At 620, the host device detects that an optical module has been inserted and reached a powered-up and ready state. At 630, the host device sends a signal to the optical module to trigger the start of the optical transceiver misconnection discovery process.

Figure 7A:
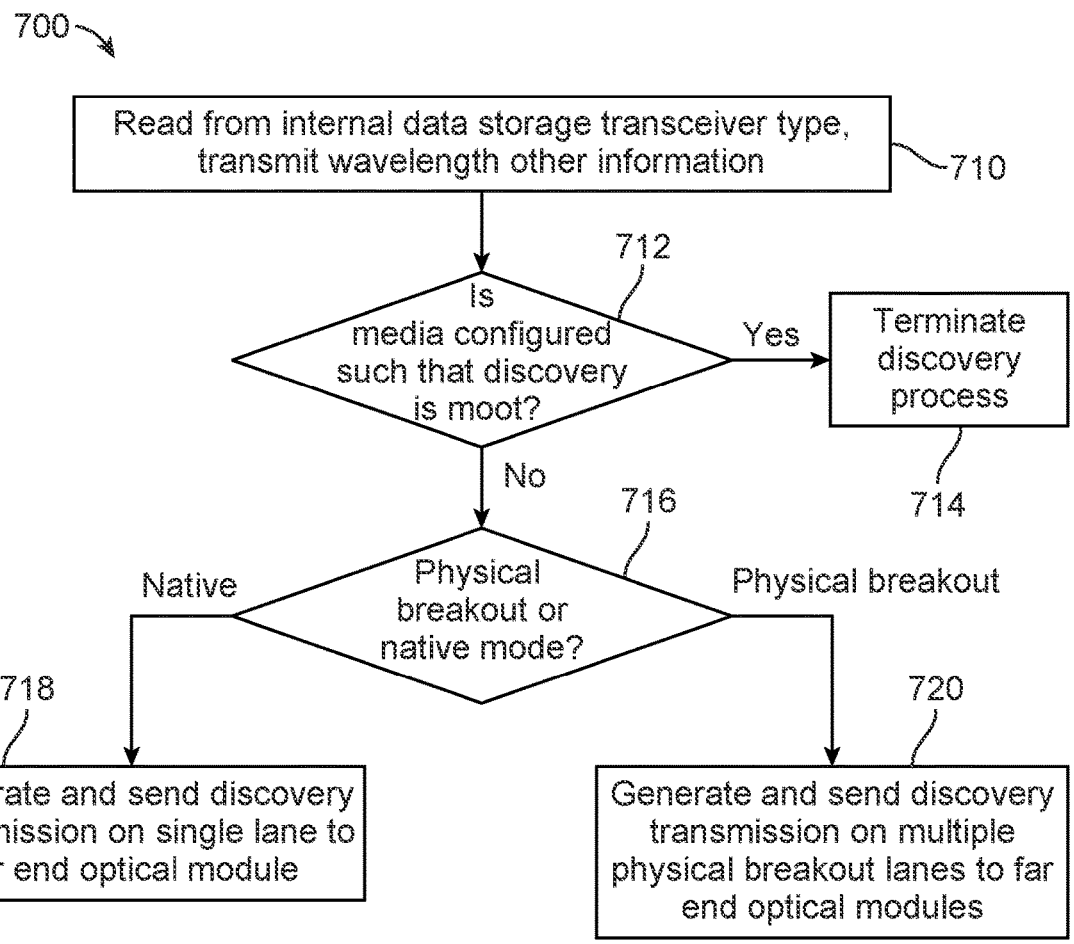
FIG. 7A is a flow chart depicting operations of an optical transceiver module in generating and sending a discovery transmission, according to an example embodiment.
Figure 7B:
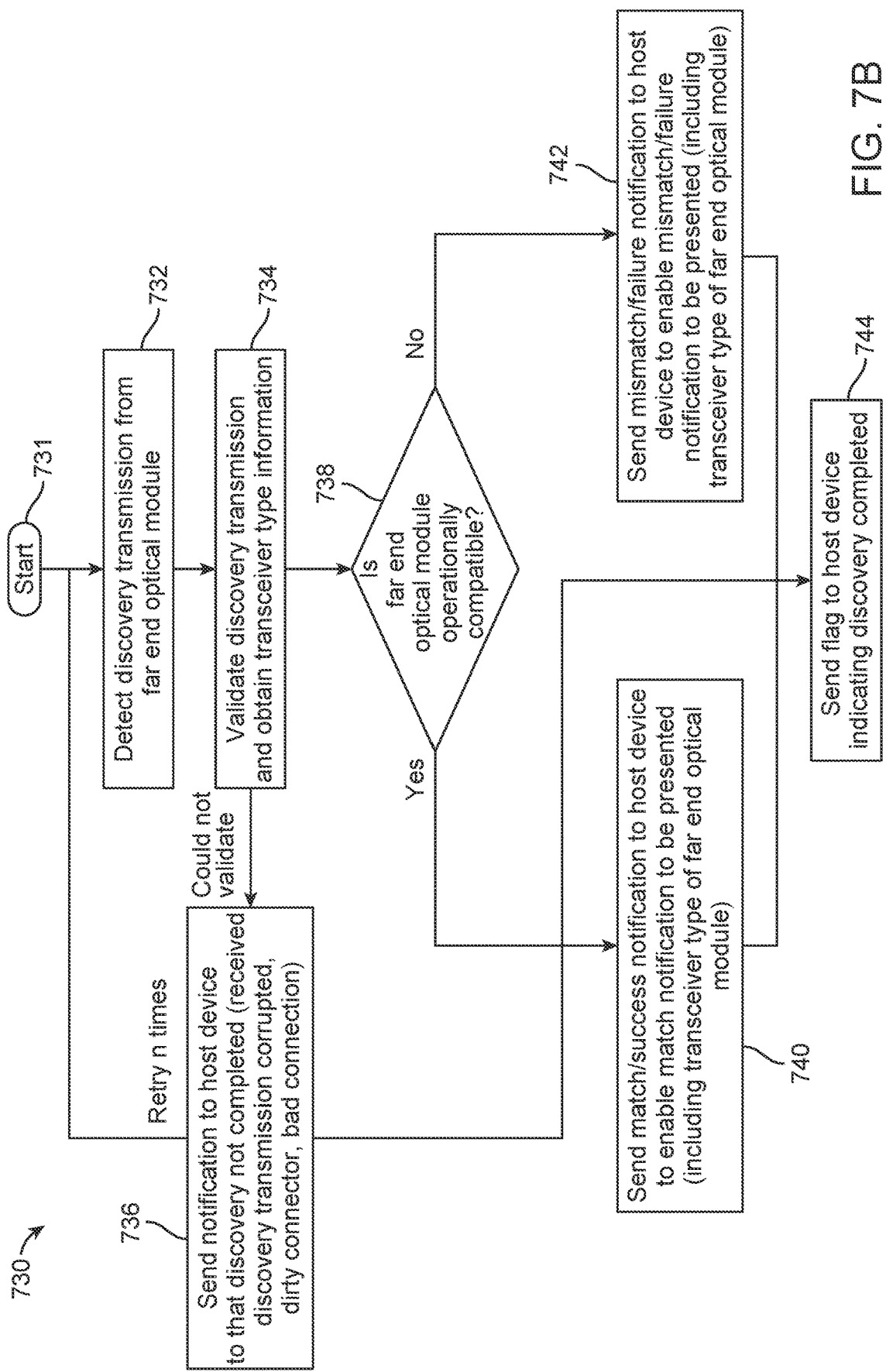
FIG. 7B is a flow chart depicting operations of an optical transceiver module in receiving a discovery transmission and determining operational compatibility with the optical transceiver module that sent the discovery transmission, according to an example embodiment.

FIG. 7A illustrates a process that the optical transceiver module performs in sending a discovery transmission to a far end optical module. FIG. 7B illustrates a process that the optical transceiver module performs in attempting to receive and interpret a discovery transmission from a far end optical module. The processes of FIGS. 7A and 7B are invoked when the optical module receives the initiation command sent in step 630 of FIG. 6, may be performed in parallel and may be controlled independently by the microcontroller of the optical module via an internal communication bus. The host device communicates with the optical module via a suitable communication bus, such as an I2C communication bus.

This discovery process occurs at the lowest layer (Layer 0), and happen before the higher protocol/communication layers are activated.

Turning now to FIG. 7A, a transmit side discovery process 700 is now described. At 710, the microcontroller of the optical transceiver module reads from internal data storage transceiver type information, transmit wavelength information and other information, as described above. Specifically, the microcontroller in the optical module reads the register for the transmitter channel to use for discovery, along with optical, electrical, and physical media interface capability. The microcontroller generates a discovery sequence based on the optical module transceiver type/profile. The microcontroller stores this sequence and uses it to modulate the laser once the optical discovery is initiated. The sequence is framed with a header to indicate the start and contains a checksum to prevent corruption during transmission, as described above in connection with FIGS. 5A and 5B.

At 712, the microcontroller determines whether the media associated with the optical transceiver module is such that the discovery process is moot. For example, if the media is configured as a loopback module, there is a copper cable connection or the media is configured as an active optical cable (because the near end is already connected to the far end by some other means or they need not be connected), then it is not necessary or appropriate to run the discovery process. If this is the case, then at 714, the discovery process is terminated. Otherwise, the process 700 continues.

At 716, based on the information read from internal memory at step 710, the microcontroller of the optical transceiver module determines whether the optical transceiver module is a type that can communicate with more than one optical transceiver module in what is called a "physical breakout" mode. For example, a 400 G module can communicate with one 400 G module or with four 100 G modules, in some cases. This is helpful to determine whether to expect one send one discovery transmission or multiple discovery transmissions, as well as whether to expect to receive one discovery transmission or multiple discovery transmissions. If it is determined at step 716 that the optical transceiver module is in native mode, then at 718, the microcontroller generates a discovery transmission and causes it to be sent on a single lane to a far end optical transceiver module.

If an optical module that supports physical breakout is inserted and the host configuration is set up to operate this optical module in a breakout mode, then the optics misconnection discovery process can run independently on each breakout link. When it is determined at step 716 that the optical transceiver module is in a physical breakout mode, then at 720, the microcontroller generates a discovery transmission and causes it to be sent on a multiple physical breakout lanes to multiple far end optical transceiver modules. The discovery transmissions sent at 718 and 720 may be sent multiple times to enable the far end optical module to have multiple opportunities at receiving and validating it.

Reference is now made to FIG. 7B, which depicts a receive side discovery process 730. The receive discovery process starts at 731. At 732, a discovery transmission from the far end optical module is detected. The optical module will detect the presence of optical power when a monitor photodiode current threshold is above a pre-defined threshold.

At 734, the received discovery transmission is parsed to extract its information components (including the transceiver type information) and the transmission is validated (using a frame check or checksum). If the received discovery transmission is not validated, then at 736, a notification is sent to the host device that the discovery is not completed because the received discovery transmission was corrupted (due a dirty connector, bad connection, etc.). Further attempts to receive a discovery transmission may be made, after which the process 730 is terminated if the discovery transmission cannot be validated.

At 738, when the received discovery transmission is validated, the microcontroller of the optical module compares the transceiver type information contained in the received discovery transmission with the transceiver type information of the optical module to determine whether the far end optical module is compatible with the near end optical module. This operation may involve looking up against the compatibility information 484 stored in internal data storage (FIG. 4).

If it is determined at 738 that the far end optical mode is operationally compatible with the near end optical module (a match), then at 740, the optical module sends a success notification to the host device that enables a match notification to be (visually and/or audibly) presented on the host device to an installer. This may also allow the host device to visually present an indication of the particular transceiver type of the far end optical module.

Conversely, if it is determined at 738 that the far end optical module is not operationally compatible with the near end optical module (a mismatch), then at 742, the optical module sends a mismatch/failure notification to the host device that enables the host device to present a mismatch/failure notification to be presented to an installer, along with an indication of the transceiver type of the far end optical module.

The microcontroller will set the content of the misconnection status location (register) 488 according to the outcome of the determination in step 738.

A transceiver type match (also called operational compatibility determination) can occur when the transceiver type of the near end optical module and the transceiver type of the far end optical module are exactly the same, and also when they are not exactly the same, but are otherwise operationally compatible. Operational compatibility may be based on wavelength(s) of operation, data rate/speed and modulation type. A lower speed module, for example a 10 G optical module cannot work with a 25 G optical module at the speed of 25 Gb/s. As another example, two modules of nominally the same speed and technology, for example 100GBASE-LR4 and 100G-CWDM4, both are 4 wavelength interfaces with each wavelength running at ~25 Gb/s, but the modules operate those 4 channels at different wavelengths and therefore would not be able to interoperate. However, certain optical modules may be able to support multiple signaling rates and thus can work with slower speed optical modules. Another example would be a 400G DR4 optical transceiver module, when configured in software to be in breakout mode, can interoperate with 4 instances of optical transceiver modules of the following optics types 100G ER, 100G LR, 100G FR, or with 100G DR.

The discovery process presented herein is intended to determine operational compatibility of optical modules, and in particular, when there is operational incompatibility. The discovery process enables some level of communication between modules that are possibly very different and not compatible to work together, so as to make the determination that they are in fact not compatible. A higher layer of software of management may be able to use this process to determine when misconnected modules may still operate when, for example, a 400GBASE-FR4 and a 400GBASE-LR4-6 are connected together over a short enough fiber that each module receives the other module's signals within specification, since they operate at same speed and same wavelengths for each channel.

After operation 736 times out, or after the notifications sent in steps 740 and 742, at 744, the optical module sends to the host device a flag indicating that discovery is completed. When a mismatch/failure notification is sent to the host device, the host device may also generate one or more alarms to indicate that a link on one or more lanes is down.

As indicated in FIG. 5B, an optical transceiver module may include a mismatch acknowledgement 550 (indicating whether a mismatch has been determined) and a discovery complete acknowledgement 552 in a discovery transmission to the far end optical transceiver module if and when it has made such a determination based on a received discovery transmission from that far end optical transceiver module. This may occur when a given optical transceiver module has received and processed a discovery transmission prior to its sending a first instance of a discovery transmission or prior to sending a subsequent instance of a discovery transmission. The discovery mismatch and discover complete acknowledgement flags are issued for two reasons: first, is to alert the remote side that the far side has completed its discovery, and second, for the host device to take over control. The host device responds to this flag from the optical transceiver module to allow it to take control of the link and complete the following steps to bring up the link or declare the link down.

Interrupt/Alarm to Indicate Misconnection

As described above, if a misconnection is detected based on the outcome of the determination made in step 738 of FIG. 7B, the local optical module triggers an interrupt which sends an alert to the host device. The host device detects this interrupt and starts the execution of an interrupt service routine to give two visual alerts:

1. A blinking pattern or color change in the host's front panel LEDs (as shown in FIG. 1) for the relevant port.
2. An error message indicating there is a misconnection displayed on the host device as the relevant port's status. This error message may also indicate the transceiver type determined for the far end optical transceiver module based on the transceiver type information contained in a discovery transmission received from the far end optical transceiver module. The transceiver type of the far end optical transceiver module may be displayed on the host device regardless of whether the far end optical transceiver module is determined to be compatible or incompatible.

Having both alerts accommodates an operator's proximity to the optical module, as the first alert can be useful when an installer is physically present with the host and module, while the second alert can be useful when connecting to the host remotely. While the state of the connection to a remote module remains unknown during or after the process of transceiver misconnection discovery (process still going on, bad connection, dirty fiber/connector, no signal detected from the remote end, or bad module on either end), the front panel LEDs for the relevant port could blink in alternating colors to indicate this.

Below is a table showing examples of LED alerts that may be presented on a host device to indicate a state of a connection associated with a local optical transceiver module with respect to a remote optical transceiver module.

| State | Possible LED Patterns | Message |
| --- | --- | --- |
| Correct connection (Operationally Compatible) | Flashing green | Success: Optical Module A and Optical Module B (far end) match and Optical Module B is "XYZ" transceiver type. |
| Mismatch detected (Operationally Incompatible) | Flashing red | Optic Type Mismatch: Optical Module A and Optical Module B are a mismatch. Optical Module B is "ABC" transceiver type. |
| Unknown/In process | Alternating red/green | Transceiver misconnection status unknown: could be due to loose connections, dirty fiber or connector, undetected or corrupted signal from the remote end, or bad module(s). |

While the foregoing description suggests that the notifications are made on the host device, it is also envisioned that the optical transceiver module may have suitable visual notification means, such as LEDs, to indicate whether a match has been detected with a far end optical transceiver module.

In summary, a method is provided for optical transceiver misconnection identification that allows a simple low-level process to monitor and communicate optical transceiver (characteristics) information between two modules regardless of their optical transceiver type to determine if they are correctly connected or mismatched. If a mismatch is determined, the knowledge gained about the transceiver type of a far end module may be obtained (and presented to an installer) and used by an installer to select and install a module that is operationally compatible with the far end optical module.

The method can be widely used during setup and initial deployment at installation sites. This method identifies and notifies to the onsite personnel when incompatible modules have been connected. Additional data, such as the location of the module, or other data from module registers, etc., in the host can be accessed on top of this primary identification.

Figure 8:
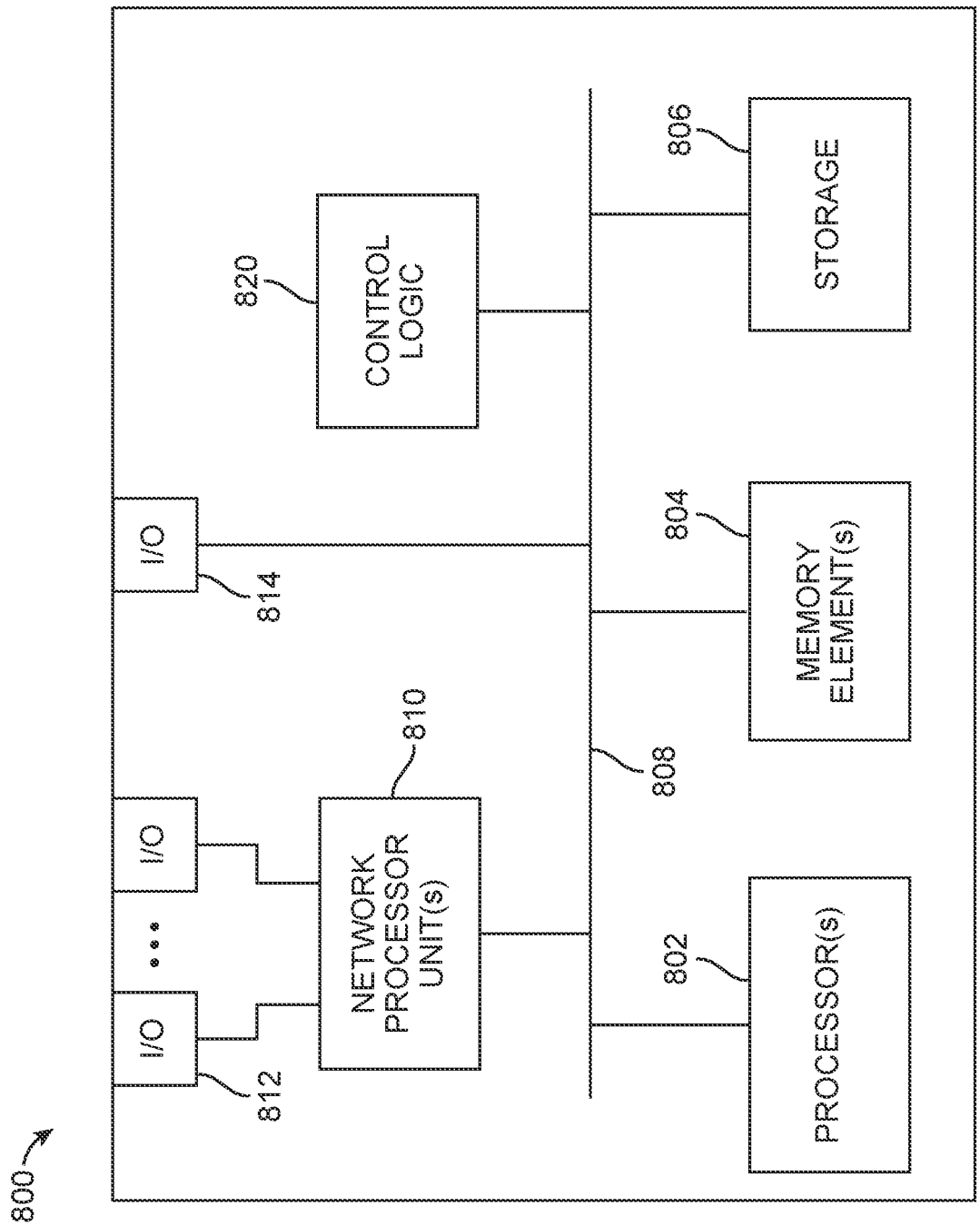
FIG. 8 is a high-level block diagram of a host device, according to an example embodiment.

Referring to FIG. 8, FIG. 8 illustrates a high-level hardware block diagram of a host device 800 that may interface with an optical transceiver module.

In at least one embodiment, the host device 800 may be any apparatus that may include one or more processor(s) 802, one or more memory element(s) 804, storage 806, a bus 808, one or more network processor unit(s) 810 interconnected with one or more network input/output (I/O) interface (s) 812, one or more I/O interface(s) 814, and control logic 820. In various embodiments, instructions associated with logic for host device 800 can overlap in any manner and are not limited to the specific allocation of instructions and/or operations described herein.

In at least one embodiment, processor(s) 802 is/are at least one hardware processor configured to execute various tasks, operations and/or functions for host device 800 as described herein according to software and/or instructions configured for host device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with host device 800, and/or logic configured for memory element(s) 804 and/or storage 806. For example, any logic described herein (e.g., control logic 820) can, in various embodiments, be stored for host device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of host device 800 to communicate in order to exchange information and/or data. Bus 808 can be implemented with any architecture designed for passing control, data and/or information between processors, memory elements/storage, peripheral devices, and/or any other hardware and/or software components that may be configured for host device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between host device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, wireless receivers/transmitters/transceivers, baseband processor(s)/modem(s), and/or other similar network interface driver(s) and/or controller(s) now known or hereafter developed to enable communications between host device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to host device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a monitor, a display screen, or the like.

In various embodiments, control logic 820 can include instructions that, when executed, cause processor(s) 802 to perform operations, which can include, but not be limited to, providing overall control operations of host device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a host device for transfer onto another computer readable storage medium.

In some aspects, the techniques described herein relate to a method including: receiving at a first optical transceiver module, via an optical fiber, from a second optical transceiver module, an optical transmission modulated with data that indicates a transceiver type of the second optical transceiver module; and determining at the first optical transceiver module, based on the transceiver type of the second optical transceiver module, whether the first optical transceiver module is operationally compatible with the second optical transceiver module.

In some aspects, the optical transmission is an optical transmission that does not carry network data traffic.

In some aspects, the method further includes: at the first optical transceiver module, retrieving from a data storage an indication of the transceiver type of the first optical transceiver module; wherein determining includes determining whether the transceiver type of the second optical transceiver module is operationally compatible with the transceiver type of the first optical transceiver module.

In some aspects, the determining includes performing a look up in stored compatibility information to determine whether the transceiver type of the second optical transceiver module is operationally compatible with the transceiver type of the first optical transceiver module.

In some aspects, the method further includes presenting on a host device connected to the first optical transceiver module or on the first optical transceiver module, an indication of whether the first optical transceiver module is operationally compatible with the second optical transceiver module.

In some aspects, the presenting includes presenting an indication of the transceiver type of the second optical transceiver module.

In some aspects, the method further includes providing from the first optical transceiver module to a host device connected to the first optical transceiver module, a notification about operational compatibility of the second optical transceiver module with the second optical transceiver module.

In some aspects, when it is determined that the first optical transceiver module is operationally compatible with the second optical transceiver module, the method further includes providing a notification to a first host device connected to the first optical transceiver module to enable higher speed optical communications with a second host device connected to the second optical transceiver module.

In some aspects, the method further includes: at the first optical transceiver module, retrieving from a data storage of the first optical transceiver module, an indication of a transceiver type of the first optical transceiver module; and transmitting from the first optical transceiver module, via an optical fiber, to a second optical transceiver module, an optical transmission modulated with data that indicates the transceiver type of the first optical transceiver module.

In some aspects, the method further includes generating the optical transmission by turning on and off a laser in the first optical transceiver module to modulate light produced by the laser with data that indicates the transceiver type of the first optical transceiver module.

In some aspects, transmitting includes transmitting from the first optical transceiver module a plurality of optical transmissions modulated with data that indicates the transceiver type of the first optical transceiver module, the plurality of optical transmissions being sent over a corresponding one of a plurality of physical breakout lanes.

In some aspects, the method further includes determining, a wavelength over which to send the optical transmission to the second optical transceiver module.

In some aspects, the determining the wavelength is based on information retrieved from the data storage of the first optical transceiver module.

In some aspects, the techniques described herein relate to an apparatus including: an optical transmitter in a first optical transceiver module, wherein the optical transmitter includes at least one laser that generates an optical signal to be propagated via an optical fiber; an optical receiver in the first optical transceiver module, wherein the optical receiver includes at least one photodetector that detects an optical signal received via an optical fiber and produces an electrical signal, wherein the optical receiver is configured to receive from a second optical transceiver module, an optical transmission modulated with data that indicates a transceiver type of the second optical transceiver module; and a controller coupled to the optical receiver and to the optical transmitter, wherein the controller is configured to determine, based on the transceiver type of the second optical transceiver module, whether the first optical transceiver module is operationally compatible with the second optical transceiver module.

In some aspects, the apparatus further includes a data storage that stores an indication of a transceiver type of the first optical transceiver module, and wherein the controller is configured to determine whether the transceiver type of the second optical transceiver module is operationally compatible with the transceiver type of the first optical transceiver module.

In some aspects, the data storage further stores compatibility information, and wherein the controller is configured to determine whether the transceiver type of the second optical transceiver module is operationally compatible with the transceiver type of the first optical transceiver module based on the compatibility information.

In some aspects, the controller is further configured to generate a data sequence that indicates the transceiver type of the first optical transceiver module, and to provide the data sequence to the optical transmitter to cause the optical transmitter to send to the second optical transceiver module an optical transmission modulated with the data sequence.

In some aspects, the controller is configured to send to a notification to a host connected to the first optical transceiver module, the notification including an indication of whether the first optical transceiver module is operationally compatible with the second optical transceiver module.

In some aspects, the notification includes an indication of the transceiver type of the second optical transceiver module.

In some aspects, the techniques described herein relate to a method including: receiving at a first optical transceiver module, via an optical fiber, from a second optical transceiver module, an optical transmission modulated with data that indicates a transceiver type of the second optical transceiver module; and presenting on a host device connected to the first optical transceiver module or on the first optical transceiver module, an indication of the transceiver type of the second optical transceiver module.

In some aspects, the optical transmission is an optical transmission that does not carry network data traffic.

In some aspects, the method further includes determining at the first optical transceiver module, based on the transceiver type of the second optical transceiver module, whether the first optical transceiver module is operationally compatible with the second optical transceiver module.

In some aspects, the techniques described herein relate to an apparatus including: an optical receiver of a first optical transceiver module and configured to be coupled to an optical fiber and configured to receive an optical transmission modulated with data that indicates a transceiver type of the second optical transceiver module; and a controller coupled to the optical receiver and configured to present to/on a host device connected to the first optical transceiver module or on the first optical transceiver module, an indication of the transceiver type of the second optical transceiver module.

In some aspects, the techniques described herein relate to a system that includes a first optical transceiver module and a second optical transceiver, and at least one optical fiber coupled between the first optical transceiver module and the second optical transceiver module. The first optical transceiver module is configured to receive, via the at least one optical fiber, an optical transmission modulated with data that indicates a transceiver type of the second optical transceiver module, and to determine, based on the transceiver type of the second optical transceiver module, whether the first optical transceiver module is operationally compatible with the second optical transceiver module. The second optical transceiver module is configured to receive, via the at least one optical fiber, an optical transmission modulated with data that indicates a transceiver type of the first optical transceiver module, and to determine, based on the transceiver type of the first optical transceiver module, whether the second optical transceiver module is operationally compatible with the first optical transceiver module.

In still another form, the methods presented herein may be implemented by instructions encoded in one or more non-transitory computer readable storage media, the instructions, when executed by a processor, cause the processor to perform operations of the various methods.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving at a first optical transceiver module, via an optical fiber, from a second optical transceiver module, an optical transmission modulated with data that indicates a transceiver type of the second optical transceiver module;
   determining at the first optical transceiver module, based on the transceiver type of the second optical transceiver module, whether the first optical transceiver module is operationally compatible with the second optical transceiver module; and
   presenting on a host device connected to the first optical transceiver module or on the first optical transceiver module, an indication of whether the first optical transceiver module is operationally compatible with the second optical transceiver module.

2. The method of claim 1, wherein the optical transmission is an optical transmission that does not carry network data traffic.

3. The method of claim 1, further comprising:
   at the first optical transceiver module, retrieving from a data storage an indication of the transceiver type of the first optical transceiver module;
   wherein determining comprises determining whether the transceiver type of the second optical transceiver module is operationally compatible with the transceiver type of the first optical transceiver module.

4. The method of claim 3, wherein determining includes performing a look up in stored compatibility information in the data storage to determine whether the transceiver type of the second optical transceiver module is operationally compatible with the transceiver type of the first optical transceiver module.

5. The method of claim 1, wherein presenting includes presenting an indication of the transceiver type of the second optical transceiver module.

6. The method of claim 1, further comprising providing from the first optical transceiver module to a host device connected to the first optical transceiver module, a notification about operational compatibility of the second optical transceiver module with the second optical transceiver module.

7. A method comprising:
   receiving at a first optical transceiver module, via an optical fiber, from a second optical transceiver module, an optical transmission modulated with data that indicates a transceiver type of the second optical transceiver module;
   determining at the first optical transceiver module, based on the transceiver type of the second optical transceiver module, whether the first optical transceiver module is operationally compatible with the second optical transceiver module; and
   when it is determined that the first optical transceiver module is operationally compatible with the second optical transceiver module, providing a notification to a first host device connected to the first optical transceiver module to enable higher speed optical communications with a second host device connected to the second optical transceiver module.

8. The method of claim 7, further comprising:
   at the first optical transceiver module, retrieving from a data storage of the first optical transceiver module, an indication of a transceiver type of the first optical transceiver module; and
   transmitting from the first optical transceiver module, via an optical fiber, to the second optical transceiver module, an optical transmission modulated with data that indicates the transceiver type of the first optical transceiver module.

9. The method of claim 8, further comprising:
   generating the optical transmission by turning on and off a laser in the first optical transceiver module to modulate light produced by the laser with data that indicates the transceiver type of the first optical transceiver module.

10. The method of claim 8, wherein transmitting comprises transmitting from the first optical transceiver module a plurality of optical transmissions modulated with data that indicates the transceiver type of the first optical transceiver module, the plurality of optical transmissions being sent over a corresponding one of a plurality of physical breakout lanes.

11. The method of claim 8, further comprising:
determining, a wavelength over which to send the optical transmission to the second optical transceiver module.

12. The method of claim 11, wherein determining is based on information retrieved from a data storage of the first optical transceiver module.

13. An apparatus comprising:
an optical transmitter in a first optical transceiver module, wherein the optical transmitter includes at least one laser that generates an optical signal to be propagated via an optical fiber;
an optical receiver in the first optical transceiver module, wherein the optical receiver includes at least one photodetector that detects an optical signal received via an optical fiber and produces an electrical signal, wherein the optical receiver is configured to receive from a second optical transceiver module, an optical transmission modulated with data that indicates a transceiver type of the second optical transceiver module; and
a controller coupled to the optical receiver and to the optical transmitter, wherein the controller is configured to determine, based on the transceiver type of the second optical transceiver module, whether the first optical transceiver module is operationally compatible with the second optical transceiver module,
wherein the controller is further configured to generate a data sequence that indicates the transceiver type of the first optical transceiver module, and to provide the data sequence to the optical transmitter to cause the optical transmitter to send to the second optical transceiver module an optical transmission modulated with the data sequence.

14. The apparatus of claim 13, further comprising a data storage that stores an indication of a transceiver type of the first optical transceiver module, and wherein the controller is configured to determine whether the transceiver type of the second optical transceiver module is operationally compatible with the transceiver type of the first optical transceiver module based on the indication of the transceiver type of the first optical transceiver module.

15. The apparatus of claim 14, wherein the data storage further stores compatibility information, and wherein the controller is configured to determine whether the transceiver type of the second optical transceiver module is operationally compatible with the transceiver type of the first optical transceiver module based on the compatibility information.

16. The apparatus of claim 13, wherein the controller is configured to send to a notification to a host connected to the first optical transceiver module, the notification including an indication of whether the first optical transceiver module is operationally compatible with the second optical transceiver module.

17. The apparatus of claim 16, wherein the notification includes an indication of the transceiver type of the second optical transceiver module.

18. An apparatus comprising:
an optical transmitter in a first optical transceiver module, wherein the optical transmitter includes at least one laser that generates an optical signal to be propagated via an optical fiber;
an optical receiver in the first optical transceiver module, wherein the optical receiver includes at least one photodetector that detects an optical signal received via an optical fiber and produces an electrical signal, wherein the optical receiver is configured to receive from a second optical transceiver module, an optical transmission modulated with data that indicates a transceiver type of the second optical transceiver module; and
a controller coupled to the optical receiver and to the optical transmitter, wherein the controller is configured to determine, based on the transceiver type of the second optical transceiver module, whether the first optical transceiver module is operationally compatible with the second optical transceiver module,
wherein the controller is configured to send to a notification to a host device connected to the first optical transceiver module, the notification including an indication of whether the first optical transceiver module is operationally compatible with the second optical transceiver module.

19. The apparatus of claim 18, further comprising a data storage that stores an indication of a transceiver type of the first optical transceiver module, and wherein the controller is configured to determine, based on the indication of the transceiver type of the first optical transceiver module, whether the transceiver type of the second optical transceiver module is operationally compatible with the transceiver type of the first optical transceiver module.

20. The apparatus of claim 19, wherein the data storage further stores compatibility information, and wherein the controller is configured to determine whether the transceiver type of the second optical transceiver module is operationally compatible with the transceiver type of the first optical transceiver module based further on the compatibility information.

* * * * *